United States Patent
Jeon et al.

(10) Patent No.: US 9,279,994 B2
(45) Date of Patent: Mar. 8, 2016

(54) STEREOSCOPIC IMAGE DISPLAY DEVICE

(71) Applicant: LG CHEM, LTD., Seoul (KR)

(72) Inventors: Byoung Kun Jeon, Daejeon (KR); Moon Soo Park, Daejeon (KR); Sin Young Kim, Daejeon (KR); Su Young Ryu, Daejeon (KR)

(73) Assignee: LG Chem, Ltd., Seoul (KR)

( * ) Notice: Subject to any disclaimer, the term of this patent is extended or adjusted under 35 U.S.C. 154(b) by 142 days.

(21) Appl. No.: 14/031,727

(22) Filed: Sep. 19, 2013

(65) Prior Publication Data

US 2014/0029097 A1    Jan. 30, 2014

Related U.S. Application Data

(63) Continuation of application No. PCT/KR2012/002095, filed on Mar. 23, 2012.

(30) Foreign Application Priority Data

Mar. 23, 2011  (KR) .................. 10-2011-0025994
Mar. 21, 2012  (KR) .................. 10-2012-0028928

(51) Int. Cl.
*G02B 27/26*    (2006.01)
*H04N 13/04*    (2006.01)

(52) U.S. Cl.
CPC ............ *G02B 27/26* (2013.01); *H04N 13/0434* (2013.01)

(58) Field of Classification Search
CPC ............ G02B 27/22; G02B 27/2214; G02B 27/2228; G02B 27/26; G02B 27/286; G02B 5/30; H04N 13/0404; H04N 13/0409; H04N 13/0431; H04N 13/0434
USPC ............ 359/462, 464–466, 489.01, 489.07, 359/489.11; 348/42, 57, 58; 349/15, 62, 349/117, 119; 430/20, 290, 321
See application file for complete search history.

(56) References Cited

U.S. PATENT DOCUMENTS

2010/0265433 A1*  10/2010  Hoshi .............................. 349/62
2010/0296037 A1*  11/2010  Sakai et al. .................... 349/119

FOREIGN PATENT DOCUMENTS

| | | |
|---|---|---|
| CN | 101750663 A | 6/2010 |
| CN | 101896842 A | 11/2010 |
| JP | 1998-232365 A | 9/1998 |
| JP | 2001186549 A | 7/2001 |
| JP | 2005-025175 A | 1/2005 |
| JP | 2008-129334 A | 6/2008 |
| JP | 2010-096900 A | 4/2010 |
| JP | 2010-164956 A | 7/2010 |
| KR | 1020080089197 A | 10/2008 |
| KR | 1020080092415 A | 10/2008 |

* cited by examiner

*Primary Examiner* — Bumsuk Won
*Assistant Examiner* — Ephrem Mebrahtu
(74) *Attorney, Agent, or Firm* — Dentons US LLP

(57) ABSTRACT

A stereoscopic image display device (hereinafter, referred to as a "3D device") and polarizing glasses are provided. According to the 3D device and polarizing glasses, a three-dimensional image having excellent crosstalk ratio and color characteristics can be observed.

19 Claims, 11 Drawing Sheets

Fig. 3

| LS | RS | LS | RS | LS | RS |
|----|----|----|----|----|----|
| RS | LS | RS | LS | RS | LS |
| LS | RS | LS | RS | LS | RS |
| RS | LS | RS | LS | RS | LS |
| LS | RS | LS | RS | LS | RS |
| RS | LS | RS | LS | RS | LS |

Fig. 5

| LC | RC | LC | RC | LC | RC |
|----|----|----|----|----|----|
| RC | LC | RC | LC | RC | LC |
| LC | RC | LC | RC | LC | RC |
| RC | LC | RC | LC | RC | LC |
| LC | RC | LC | RC | LC | RC |
| RC | LC | RC | LC | RC | LC |

STEREOSCOPIC IMAGE DISPLAY DEVICE

This application is a Continuation Bypass Application of International Patent Application No. PCT/KR2012/002095, filed Mar. 23, 2012, and claims the benefit of Korean Patent Application No. 10-2011-0025994 filed on Mar. 23, 2011, and Korean Patent Application No. 10-2012-0028928 filed on Mar. 21, 2012, in the Korean Intellectual Property Office, the disclosures of which are incorporated herein by reference.

BACKGROUND

1. Field of the Invention

The present invention relates to a stereoscopic image display device and polarizing glasses.

2. Discussion of Related Art

A stereoscopic image display device is a display device capable of transferring three-dimensional information to an observer.

Methods for displaying stereoscopic images may include, for example, methods that use glasses and methods that don't use glasses. Also, the methods using glasses may be classified into methods using polarizing glasses and methods using LC shutter glasses, and the methods that don't use glasses may be classified into stereoscopic/multi-view point binocular disparity methods, volumetric methods, holographic methods, and the like.

SUMMARY OF THE INVENTION

The present invention provides a stereoscopic image display device and polarizing glasses.

One illustrative stereoscopic image display device (hereinafter, referred to as a "3D device") may be a device, from which three-dimensional images can be observed after wearing polarizing glasses. In one embodiment, the 3D device may include the polarizing glasses, along with a display part and a filter part, which will be described later.

The polarizing glasses may include a region (referred to as a "GR region") for a right eye and a region (referred to as a "GL region") for a left eye. The GR region may be a region located in front of the right eye of the observer when the observer wears polarizing glasses, and the GL region may be a region located in front of the left eye of the observer when the observer wears polarizing glasses.

The 3D device may include a display part and a filter part. The 3D device may further include a polarizing plate between the display part and the filter part. In one embodiment, the 3D device may sequentially include the display part, the polarizing plate and the filter part such that image signals generated from the display part are incident on the filter part after passing through the polarizing plate, and then transferring the observer wearing the polarizing glasses after passing through the filter part in a driving state.

The term "driving state" used herein may refer to a state where the 3D device is displaying the three dimensional image to the observer, unless specifically defined otherwise.

FIG. 1 shows one illustrative top view of one illustrative 3D device. In FIG. 1, an arrow may refer to a direction along which an image signal propagates in the driving state, and an observer 106 may observe the three dimensional image after wearing the polarizing glasses.

The device of FIG. 1 may include a display part 103 and a filter part 105, and further include a polarizing plate 104 between the display part 103 and the filter part 104.

As shown in FIG. 1, the 3D device 10 may further include a polarizing plate 102 and a light source 101, which are sequentially disposed on an opposite side of the polarizing plate 104 of the display part 103. Hereinafter, for convenience of description, the polarizing plate 104 disposed between the display part 103 and the filter part 105 may be referred to as a first polarizing plate, and the polarizing plate 102 disposed on the opposite side of the first polarizing plate may be referred to as a second polarizing plate.

The first and second polarizing plates 102 and 104 in the 3D device 10 are optical elements having a transmission axis and an absorption axis perpendicular to the transmission axis. When light is incident on the polarizing plate, the polarizing plate may transmit only light having a polarizing axis parallel to the transmission axis of the polarizing plate among the incident light.

In one embodiment, in the 3D device 10, the absorption axis of the first polarizing plate 104 may be formed to be perpendicular to the absorption axis of the second polarizing plate 102. In this case, the transmission axes of the first and second polarizing plates 102 and 104 may be perpendicular to each other. The term defining an angle such as "vertical," "horizontal," "perpendicular" and "parallel" as used herein may refer to substantially vertical, horizontal, perpendicular and parallel within the range in which predetermined results can be obtained. Accordingly, the above term may include a manufacturing error or variation, and may include, for example, an error within approximately ±15 degrees, ±10 degrees or ±5 degrees.

The light source 101 may be a direct-type or edge-type back light unit (BLU), which is conventionally used in a liquid crystal display (LCD). Other than that, various kinds of light sources may be used without limitation.

The display part of the 3D device may generate image signals such as image signals including a signal (hereinafter referred to as an "R signal) for the right eye and a signal (hereinafter referred to as an "L signal") for the left eye in the driving state. In one embodiment, the display part may include a region (hereinafter referred to as an "RS region") for generating the R signal, which is configured to generate the R signal and a region (hereinafter referred to as an "LS region") for generating the L signal, which is configured to generate the L signal in the driving state.

The display part may be a region including a transmission-type liquid crystal panel or a region formed by a liquid crystal layer of the liquid crystal panel. The transmission-type liquid crystal panel may sequentially include a first substrate, a pixel electrode, a first oriented film, a liquid crystal layer, a second oriented film, a common electrode and a second substrate from the light source 101. The first substrate may have an active driving circuit including a thin film transistor (TFT) as a driving element electrically connected to a transparent pixel electrode and an interconnection on a side of the light source 101. The pixel electrode may include indium tin oxide (ITO) and serve as an electrode per pixel. In addition, the first or second oriented film may include a material such as polyimide. The liquid crystal layer may include a vertical alignment (VA)-, twisted nematic (TN)-, super twisted nematic (STN)- or in plane switching (IPS)-mode liquid crystal layer. The liquid crystal layer may transmit or block light emitted from the light source 101 by pixel by a voltage applied from the driving circuit. The common electrode may include ITO and serve as a common counter electrode.

The display part 103 may include RS and LS regions formed by at least one pixel as regions configured to generate the R or L signal in the driving state. For example, the RS or LS region may be formed of a unit pixel including liquid crystals sealed between the first and second oriented films of the liquid crystal panel or may be formed of at least two of the unit pixel.

The RS and LS regions may be disposed in column and/or row direction(s). FIG. 2 shows one illustrative embodiment of the arrangement of the RS and LS regions. As shown in FIG. 2, the RS and LS regions may have stripe shapes extending in the same direction, and may be adjacently and alternately disposed. FIG. 3 shows another illustrative embodiment of the arrangement of the RS and LS regions, and the RS and LS regions are adjacently and alternately disposed in a lattice pattern. The arrangement of the RS and LS regions are not limited to those of FIGS. 2 and 3, and thus various designs known in the art may be applied.

The display part may generate image signals including the R and L signals by driving a pixel in each region according to a signal in the driving state.

For example, referring to FIG. 1, when light emitted from the light source 101 is incident on the second polarizing plate 102, only light polarized parallel to the transmission axis of the polarizing plate 102 is passed through the polarizing plate 102. When the light after passing through the polarizing plate 102 is incident on the display part 103, light after passing through the RS region may become the R signal, and light after passing through the LS region may become the L signal. When both of the R and L signals are incident on the first polarizing plate 104, only signals polarized parallel to the transmission axis of the polarizing plate 104 may be incident on the filter part 105 after passing through the polarizing plate 104.

The filter part 105 may include a first region and a second region, which are formed so as to divide image signals generated from the display part 103 into at least two signals having different polarizing states in the driving state. In the above, one of the first and second regions may be a polarization control region (hereinafter referred to as an "RC region") for an R signal, which is disposed so that the R signal is incident thereon among the signals from the display part 103, and the other region may be a polarization control region (hereinafter referred to as an "LC region") for an L signal, which is disposed so that the L signal is incident thereon among the signals from the display part 103. In this specification, the first region and the RC region may indicate the same meaning, and the second region and the LC region may indicate the same meaning.

The RC and/or LC region may include a retardation layer. In one embodiment, the LC region may include a retardation layer in which an optical axis is formed in a first direction, and the RC region may include a retardation layer in which an optical axis is formed in a second direction different from the first direction. The term "optical axis" used herein may refer to a slow axis or a fast axis during transmission of light through a corresponding region, and preferably a slow axis.

In the filter part, the RC region may have a size corresponding to the RS region and be at a position corresponding to the RS region so as for the R signal generated and transferred from the RS region to be incident on the RC region in the driving state, and the LC region may have a size corresponding to the LS region and be at a position corresponding to the LS region so as for the L signal generated and transferred from the LS region to be incident on the LC region. In the above, the size and the position of the RC or LC region, which correspond to the RS or LS region may be a size and a position, by which the R signal generated from the RS region may be incident on the RC region and the L signal generated from the LS region may be incident on the LC region, and don't necessarily mean that the both regions have the same size and are formed at the same position.

According to the arrangement of the RS and LS regions of the display part, the RC and LC regions may be formed in a stripe shape extending in the same direction and adjacently and alternately disposed, or may be formed in a lattice shape and adjacently and alternately disposed. For example, when the RS and LS regions are disposed as shown in FIG. 2, the RC and LC regions may be disposed in a shape shown in FIG. 4, and when the RS and LS regions are disposed as shown in FIG. 3, the RC and LC regions may be disposed in a shape shown in FIG. 5.

In the driving state, a signal after passing through the RC region and a signal after passing through the LC region may have different polarizing states from each other.

In one embodiment, among the signals after passing through the RC and LC regions, one may be a left-circular polarized signal, and the other may be a right-circular polarized signal. In this case, the R signal generated from the display part may be incident on the RC region after passing through the first polarizing plate, and then emitted in the left-circular polarized or right-circular polarized state. Also, the L signal generated from the display part may be incident on the LC region after passing through the first polarizing plate, and then emitted in the right-circular polarized or left-circular polarized state such that a rotation direction of the polarizing axis is opposite to that of the R signal.

As a filter capable of emitting left-circular and right-circular polarized signals, a filter including $\lambda/4$ wavelength layers as the retardation layers in the RC and LC regions may be used. To generate circular polarized lights rotating in opposite directions, an optical axis of the $\lambda/4$ wavelength layer in the RC region may be different from an optical axis of the $\lambda/4$ wavelength layer in the LC region. In one embodiment, the RC region may include the $\lambda/4$ wavelength layer having an optical axis formed in a first direction, and the LC region may include the $\lambda/4$ wavelength layer having an optical axis formed in a second direction different from the first direction. The term "$n\lambda$ wavelength layer" as used herein may refer to a phase retardation layer configured to retard a polarization by n times of wavelength of incident light, and n may be $\frac{1}{4}$, $\frac{1}{2}$ or $\frac{3}{4}$.

In the 3D device, a shape of the filter part is not limited to the above-mentioned examples. For example, if one of the RC and LC regions of the filter part includes a $3\lambda/4$ wavelength layer, and the other includes a $\lambda/4$ wavelength layer, left-circular and right-circular polarized lights may be generated. Here, the $3\lambda/4$ wavelength layer may be formed by laminating a $\lambda/2$ wavelength layer and a $\lambda/4$ wavelength layer.

FIG. 6 is a schematic diagram illustrating illustrative directions of the optical axes of the RC and LC regions of FIG. 4 or 5. In FIG. 6, the optical axis formed in the first direction in the LC region is represented by A1, and the optical axis formed in the second direction in the RC region is represented by A2.

The optical axes A1 and A2 in the RC and LC regions may be formed such that a line bisecting an angle formed by the optical axes A1 and A2 is parallel or perpendicular to the absorption axis of the first polarizing plate. According to such arrangement, signals generated from the display part and transmitted through the polarizing plate may be exactly converted into the left-circular and right-circular polarized light. As a result, a high quality three dimensional image may be realized, and a crosstalk phenomenon which may become a problem in observation of the three dimensional image may be prevented. Referring to FIG. 6, the term "line bisecting an angle formed by the optical axes" may refer to a line bisecting an angle of "($\theta1+\theta2$) degrees" or "($360-(\theta1+\theta2)$) degrees."

For example, if the "θ1" and the "θ2" are the same angle, the bisecting line may be formed in a direction parallel to a boundary line L between the RC and LC regions. The optical axes A1 and A2 of the RC and LC regions may also be perpendicular to each other. In this state, for example, in FIG. 6, the angle of "(θ1+θ2) degrees" or "(360−(θ1+θ2)) degrees" may be substantially 90 degrees. According to such arrangement, excellent characteristics of the three dimensional image such as a wide viewing angle and a high contrast ratio may be realized, and the crosstalk phenomenon may also be prevented.

If the R and L signals emitted from the filter part and having different polarizing states from each other are observed with wearing the polarizing glasses, three dimensional image may be observed.

The polarizing glasses include the GL region and the GR region. In one embodiment, the GL region may include a retardation layer and a polarizer, and the GR region may also include a retardation layer and a polarizer. FIG. 7 shows one illustrative embodiment of the polarizing glasses 70. As shown in FIG. 7, the polarizing glasses 70 may include GL and GR regions, which include a retardation layer 701L and a polarizer 702L, and a retardation layer 701R and a polarizer 702R, respectively. In FIG. 7, an arrow indicates a propagation direction of the R or L signal.

The polarizer in the polarizing glasses may be an optical element having an absorption axis formed in a predetermined direction and a transmission axis perpendicular to the absorption axis, as the polarizing plate in the 3D device.

In one embodiment, in the polarizing glasses, the polarizers may be disposed in respective regions such that the absorption axis of the polarizer in the GR region is parallel to the absorption axis of the polarizer in the GL region. In addition, the absorption axes of the respective polarizers formed parallel to each other may be disposed perpendicular to the absorption axis of the first polarizing plate under a state where the glasses are placed so as for an imaginary line connecting centers of the GL and the GR regions to be perpendicular or parallel to a boundary line between the RC region, i.e., the first region, of the 3D device and the LC region, i.e., the second region, of the 3D device. In such a state, a high quality three dimensional image may be observed.

In this specification, the term "imaginary line connecting centers of the GL and the GR regions" as used herein may refer to an imaginary line "CL" connecting centers "C's" of the GR region (GR) and the GL region (GL) as shown in FIG. 8, and the term "center of the region" as used herein may refer to a center of gravity of the region.

The GR and GL regions of the polarizing glasses may include retardation layers, respectively. The retardation layers in the GR and GL regions of the polarizing glasses may satisfy a condition of General Formula 1 or 2 with the retardation layers respectively in the RC and LC regions of the filter part.

$$D_L = |\theta_2 - \theta_L| \leq 15 \text{ degrees} \qquad \text{[General Formula 1]}$$

$$D_R = |\theta_1 - \theta_R| \leq 15 \text{ degrees} \qquad \text{[General Formula 2]}$$

In General Formulas 1 and 2, $D_L$ is a relative deviated degree of the optical axis of the retardation layer in the LC region and the optical axis of the retardation layer in the GL region, $\theta_2$ is an angle formed by the optical axis of the retardation layer in the LC region and the absorption axis of the first polarizing plate, $\theta_L$ is an angle formed by the optical axis of the retardation layer in the GL region and the absorption axis of the first polarizing plate under a state where the polarizing glasses are placed so as for the absorption axis of the polarizer in the GL region to be perpendicular to the absorption axis of the first polarizing plate, $D_R$ is a relative deviated degree of the optical axis of the retardation layer in the RC region and the optical axis of the retardation layer in the RL region, $\theta_1$ is an angle formed by the optical axis of the retardation layer in the RC region and the absorption axis of the first polarizing plate, and $\theta_R$ is an angle formed by the optical axis of the retardation layer in the GR region and the absorption axis of the first polarizing plate under a state where the polarizing glasses are placed so as for the absorption axis of the polarizer in the GR region to be perpendicular to the absorption axis of the first polarizing plate.

In General Formulas 1 and 2, each angle of $\theta_1$, $\theta_2$, $\theta_L$, or $\theta_R$ may be an angle measured clockwise or counter-clockwise from the absorption axis of the first polarizing plate, but each angle substituted to the same formula is an angle measured in the same direction.

FIG. 9 is a schematic diagram illustrating an angular direction of $D_L$ of General Formula 1. Here, an angle of the optical axis $S_F$ of the retardation layer in the LC region measured clockwise from the absorption axis $A_P$ of the first polarizing plate under a state where the polarizing glasses are placed so as for the absorption axis $A_P$ of the first polarizing plate to be perpendicular to the absorption axis $A_G$ of the polarizer of the GL region is referred to as "$\theta_2$," and an angle of the optical axis $S_G$ of the retardation layer in the GL region measured clockwise from the absorption axis $A_P$ is referred to as "$\theta_L$." In addition, FIG. 10 is a schematic diagram illustrating an angular relationship of $D_R$ in General Formula 2. Here, an angle of the optical axis SF of the retardation layer in the RC region measured counter-clockwise from the absorption axis $A_P$ of the first polarizing plate under a state where the polarizing glasses are placed so as for the absorption axis $A_P$ of the first polarizing plate to be perpendicular to the absorption axis $A_G$ of the polarizer of the GR region is referred to as "θ1," and an angle of the optical axis $S_G$ of the retardation layer of the GR region measured counter-clockwise from the absorption axis $A_P$ is referred to as "$\theta_R$."

In General Formula 1, $D_L$ may be, for example, 14 degrees or less, 13 degrees or less, 12 degrees or less, 11 degrees or less, 10 degrees or less, 9 degrees or less, 8 degrees or less, 7 degrees or less, 6 degrees or less, or 5 degrees or less. In General Formula 2, $D_R$ may be, for example, 14 degrees or less, 13 degrees or less, 12 degrees or less, 11 degrees or less, 10 degrees or less, 9 degrees or less, 8 degrees or less, 7 degrees or less, 6 degrees or less, or 5 degrees or less.

If the relationship between the optical axes of the filter part and the polarizing glasses is defined according to General Formula (s) 1 and/or 2, the quality of a three dimensional image may be improved.

The crosstalk ratio measured during observing the image emitted from the 3D device with wearing the polarizing glasses may be in the range of 6% or less, % or less, 4% or less, 3% or less, 2% or less, 1% or less or 0.5% or less. The term "crosstalk ratio (CT)" as used herein may refer to a percentage of a ratio of brightness ($L_B$) in a dark state to brightness ($L_W$) in a bright state in case where the three dimensional image emitted from the 3D device is observed with wearing the polarizing glasses, and may be calculated according to Equation 1.

$$CT = 100 \times L_B / L_W \qquad \text{[Equation 1]}$$

The term "bright state" as used herein may refer to a state in which an image signal emitted from the 3D device has passed through the polarizing glasses, and the term "dark state" as used herein may refer to a state in which an image signal emitted from the 3D device is blocked by the polarizing glasses. For example, in case where the GR region of the polarizing glasses is formed so as for the R signal emitted from the 3D device to pass through the GR region and so as for the L signal to be blocked by the GR region, and the GL region of the polarizing glasses is formed so as for the R signal emitted from the 3D device to be blocked by the GL region and so as for the L signal to pass through the GL region, the brightness $L_W$ in the bright state may be a brightness of the R signal after passing through the GR region, or a brightness of the L signal after passing through the GL region. In addition, in such a state, the brightness $L_B$ in the dark state may be a brightness of the R signal after passing through the GL region, or a brightness of the L signal after passing through the GR region.

In case where the three dimensional image emitted from the 3D device is observed with wearing the polarizing glasses, the signal in the bright state, i.e., the R signal after passing through the GR region or the L signal after passing through the GL region, may have an X value of tristimulus values in International Commission on Illumination (CIE) color space in the range from 0.322 to 0.344 and may have a Y value of tristimulus values in International Commission on Illumination (CIE) color space in the range from 0.316 to 0.350 among. The lower limit of the X value may be 0.323, 0.325, 0.326 or 0.327, and the upper limit thereof may be 0.341, 0.339, 0.337 or 0.335. The lower limit of the Y value may be 0.326, 0.329 or 0.331, and the upper limit thereof may be 0.340, 0.338, 0.337, 0.336, 0.335 or 0.334. The X and Y values may have a range selected from any number of the upper limits and/or the lower limits and combined with any number of the upper limits and/or the lower limits.

In case where the three dimensional image emitted from the 3D device is observed with wearing the polarizing glasses, the signal in the dark state, i.e., the R signal after passing through the GL region or the L signal after passing through the GR region, may have an X value of tristimulus values in International Commission on Illumination (CIE) color space in the range from 0.223 to 0.443 and a Y value of tristimulus values in International Commission on Illumination (CIE) color space in the range from 0.078 to 0.589. The lower limit of the X value may be 0.230, 0.250, 0.270, 0.290, 0.312, 0.322 or 0.331, and the upper limit thereof may be 0.436, 0.400, 0.375 or 0.355. The lower limit of the Y value may be 0.130, 0.235, 0.255, 0.275, 0.295, 0.315, 0.325 or 0.331, and the upper limit thereof may be 0.537, 0.432, 0.400, 0.355, 0.345 or 0.335. The X and Y values may have a range selected from any number of the upper limits and/or the lower limits and combined with any number of the upper limits and/or the lower limits.

To control the crosstalk ratio and the tristimulus values of the CIE color space of the 3D device or the polarizing glasses, a method of controlling a relationship between retardation values of the retardation layer of the filter part and/or polarizing glasses and/or an optical axis of each retardation layer may be used. The control of the crosstalk ratio of the 3D device or the polarizing glasses and the tristimulus values of the CIE color space may be performed by controlling wavelength dispersion properties of the retardation layers of the filter part and the polarizing glasses.

In one embodiment, as the retardation layers of the filter part and polarizing glasses, a retardation layer having a normal wavelength dispersion property (hereinafter referred to as an "N property"), a flat wavelength dispersion property (hereinafter referred to as an "F property"), or a reverse wavelength dispersion property (hereinafter referred to as an "R property") may be used.

In the specification, the mark "R(λ)" as used in the description of the wavelength dispersion property of the retardation layer may refer to a retardation value of the retardation layer measured with respect to light having a wavelength of λ nm. For example, R(450), R(550) and R(650) may refer to retardation values measured with respect to light having wavelengths of 450 nm, 550 nm, and 650 nm, respectively.

In addition, the retardation value may be in-plane retardation ($R_{IN}$) calculated as in Equation 2, or retardation ($R_{TH}$) in thickness direction calculated as in Equation 3, and preferably in-plane retardation ($R_{IN}$) calculated as in Equation 2.

$$R_{IN} = (X-Y) \times D \quad \text{[Equation 2]}$$

$$R_{TH} = (Z-Y) \times D \quad \text{[Equation 3]}$$

In Equations 2 and 3, $R_{IN}$ and $R_{TH}$ are the in-plane retardation and the retardation in thickness direction, respectively, X is a refractive index in a direction of a slow axis in a plane of the retardation layer, Y is a refractive index in a direction of a fast axis in the plane of the retardation layer, Z is a refractive index in a thickness direction of the retardation layer, and D is a thickness of the retardation layer.

Unless specifically defined otherwise, the term "retardation layer having the N property" as used herein may refer to a retardation layer having R(450)/R(550) larger than R(650)/R(550). In one embodiment, in the retardation layer having the N property, R(450)/R(550) may be in the range from 1.01 to 1.19, from 1.02 to 1.18, from 1.03 to 1.17, from 1.04 to 1.16, from 1.05 to 1.15, from 1.06 to 1.14, from 1.07 to 1.13, from 1.08 to 1.12 or from 1.09 to 1.11. In the retardation layer having the N property, R(650)/R(550) may be 0.81 to 0.99, 0.82 to 0.98, 0.83 to 0.97, 0.84 to 0.96, 0.85 to 0.95, 0.86 to 0.94, 0.87 to 0.93, 0.88 to 0.92, or 0.89 to 0.91. In addition, in the retardation layer having the N property, {R(650)−R(450)}/{200×R(550)} may be in the range from −0.0019 to −0.0001, from −0.0018 to −0.0002, from −0.0017 to −0.0003, from −0.0016 to −0.0004, from −0.0015 to −0.0005, from −0.0014 to −0.0006, from −0.0013 to −0.0007, from −0.0012 to −0.0008, from −0.0011 to −0.0009, or approximately −0.001.

Unless specifically defined otherwise, the term "retardation layer having the F property" as used herein may refer to a retardation layer, of which R(450)/R(550) is substantially the same as R(650)/R(550). In one embodiment, in the retardation layer having the F property, R(450)/R(550) and R(650)/R(550) may be each in the range from 1.01 to 1.19, from 1.02 to 1.18, from 1.03 to 1.17, from 1.04 to 1.16, from 1.05 to 1.15, from 1.06 to 1.14, from 1.07 to 1.13, from 1.08 to 1.12, or from 1.09 to 1.11. In addition, in the retardation layer having the F property, {R(650)−R(450)}/{200×R(550)} may be within ±0.0009, ±0.0008, ±0.0007, ±0.0006, ±0.0005, ±0.0004, ±0.0003, ±0.0002, ±0.0001 or approximately 0.

Unless specifically defined otherwise, the term "retardation layer having the R property" as used herein may refer to a retardation layer, of which R(450)/R(550) is less than R(650)/R(550). In one embodiment, in the retardation layer having the R property, R(450)/R(550) may be in the range from 0.81 to 0.99, from 0.82 to 0.98, from 0.83 to 0.97, from 0.84 to 0.96, from 0.85 to 0.95, from 0.86 to 0.94, from 0.87 to 0.93, from 0.88 to 0.92 or from 0.89 to 0.91. In addition, in the retardation layer having the R property, R(650)/R(550) may be in the range from 1.01 to 1.19, from 1.02 to 1.18, from 1.03 to 1.17, from 1.04 to 1.16, from 1.05 to 1.15, from 1.06 to 1.14, from 1.07 to 1.13, from 1.08 to 1.12 or from 1.09 to 1.11. Furthermore, in the retardation layer having the R property, {R(650)−R(450)}/{200×R(550)} may be in the range from 0.0001 to 0.0019, from 0.0002 to 0.0018, from 0.0003 to 0.0017, from 0.0004 to 0.0016, from 0.0005 to 0.0015, from 0.0006 to 0.0014, from 0.0007 to 0.0013, from 0.0008 to 0.0012, from 0.0009 to 0.0011, or approximately 0.001.

In one embodiment, the retardation layer of the filter part and the retardation layer of the polarizing glasses, for example, the retardation layer of the RC region and the retardation layer of the GR region and/or the retardation layer of the LC region and the retardation of the GL region, may have the same wavelength dispersion property. The retardation layers having the same wavelength dispersion property may satisfy Equation 4.

$$-20 \text{ nm} \leq R_2(\lambda) - R_1(\lambda) \leq 20 \text{ nm}$$ [Equation 4]

In Equation 4, $R_1(\lambda)$ is a retardation value of the retardation layer of the filter part measured with respect to light having a wavelength of $\lambda$ nm, and $R_2(\lambda)$ is a retardation value of the retardation layer of the polarizing glasses measured with respect to light having a wavelength of $\lambda$ nm.

In one embodiment, the lower limit of the "$R_2(\lambda)-R_1(\lambda)$" may be −15 nm, −10 nm, or −5 nm. In one embodiment, the upper limit of the "$R_2(\lambda)-R_1(\lambda)$" may be 15 nm, 10 nm, or 5 nm.

The crosstalk ratio and the tristimulus value of the three dimensional image may be maintained within suitable ranges by applying the retardation layer having a wavelength dispersion property satisfying the above conditions to each of the filter part and the polarizing glasses, and therefore a high quality three dimensional image having an excellent color characteristic may be observed.

When the retardation layers of the filter part and the polarizing glasses have the same wavelength dispersion property, as the retardation layer, a retardation layer having the N, R or F property may be used, and preferably, a retardation layer having the R property may be used.

In another embodiment, the retardation layer of the filter part and the retardation layer of the polarizing glasses, for example, the retardation layer of the RS region and the retardation layer of the GR region and/or the retardation layer of the LS region and the retardation of the GL region, may have different wavelength dispersion properties from each other. The retardation layers having different wavelength dispersion properties may satisfy Equation 5.

$$-40 \text{ nm} \leq R_2(\lambda) - R_1(\lambda) \leq 40 \text{ nm}$$ [Equation 5]

In Equation 5, $R_1(\lambda)$ is a retardation value of the retardation layer of the filter part measured with respect to light having a wavelength of $\lambda$ nm, and $R_2(\lambda)$ is a retardation value of the retardation layer of the polarizing glasses measured with respect to light having a wavelength of $\lambda$ nm.

In one embodiment, the lower limit of the "$R_2(\lambda)-R_1(\lambda)$" may be −35 nm, −30 nm, −25 nm, −20 nm, −15 nm, −10 nm, or −5 nm. In one embodiment, the upper limit of the "$R_2(\lambda)-R_1(\lambda)$" may be 35 nm, 30 nm, 25 nm, 20 nm, 15 nm, 10 nm, or 5 nm.

The crosstalk ratio and the tristimulus value of a three dimensional image may be maintained within suitable ranges by applying the retardation layer having a wavelength dispersion property satisfying the above-mentioned conditions to each of the filter part and the polarizing glasses, and therefore a high quality three dimensional image having an excellent color characteristic may be observed.

In case where the retardation layers of the filter part and the polarizing glasses have different wavelength dispersion properties from each other, if the retardation layer of the filter part is a retardation layer having the F property, the retardation layer of the polarizing glasses may be a retardation layer having the R or N property; if the retardation layer of the filter part is a retardation layer having the N property, the retardation layer of the polarizing glasses may be a retardation layer having the R or F property; and if the retardation layer of the filter part is a retardation layer having the R property, the retardation layer of the polarizing glasses may be a retardation layer having the N or F property.

As the retardation layer having the N, R or F property, various materials known in the art may be used without limitation as long as the material satisfies characteristics required for each property.

For example, as the retardation layer, a liquid crystal layer which may be obtained by polymerizing a polymerizable liquid crystal compound, a polymer film having retardation provided by a process such as uniaxial orientation or biaxial orientation, or a laminated film of the liquid crystal layer and the polymer film may be used.

The liquid crystal layer may include a polymerizable liquid crystal compound polymerized in an oriented state due to an adjacent oriented layer. For example, the liquid crystal layer may be formed by forming an oriented layer on a suitable substrate, and coating, orienting and polymerizing a liquid crystal composition including the polymerizable liquid crystal compound on the oriented layer. The substrate may be an isotropic substrate without retardation, or a substrate having suitable retardation to realize a suitable wavelength dispersion property when necessary. The oriented layer may be a conventional oriented layer known in the art, for example, an optical oriented layer having orientation determined by cis-trans isomerization, Fries rearrangement or dimerization, which is induced by irradiation of linearly polarized light, and capable of inducing orientation to an adjacent liquid crystal layer according to the determined orientation, a polymer layer such as a rubbing-treated polyimide layer, or an acryl-curable resin layer in which a plurality of grooves are patterned. In addition, a kind of the polymerizable liquid crystal compound coated on the oriented layer is not specifically limited, and thus a known compound such as reactive mesogen (RM) produced by Merk or LC242 produced by BASF may be used.

In addition, the polymer film having a retardation provided by uniaxial or biaxial orientation may be an acryl film such as a poly(methyl methacrylate) (PMMA) film, or a cycloolefin polymer (COP) film such as a polynorbornene (PNB) film, but the present invention is not limited thereto.

The retardation layer may be formed by stacking at least two polymer films described above, or alternately stacking at least one liquid crystal layer and at least one polymer film.

The present invention also relate to polarizing glasses, for example, to polarizing glasses for observing the three dimensional image.

The polarizing glasses may be used for observing the three dimensional image emitted from a 3D device that includes a display part configured to generate an image signal; and a filter part including first and second regions configured to divide the image signal from the display part into at least two signals having different polarizing states from each other. The first and second regions may include retardation layers. The 3D device may further include a first polarizing plate between the display part and the filter part if necessary. In one embodiment, the 3D device may be the 3D device previously described in the corresponding part of this specification, and in this case, the previous descriptions regarding the 3D device and the polarizing glasses may be applied to the part of the polarizing glasses in the same manner.

In one embodiment, the polarizing glasses may be the same as those described in the description of the 3D device. Therefore, the polarizing glasses may include the GR region and the GL region, and the GR and GL regions may each include a retardation layer and a polarizer.

If the image emitted from the 3D device is observed with wearing the polarizing glasses, the crosstalk ratio and the X and Y values of tristimulus values of CIE color space of image signals in the bright state and the dark state may be in the same range as those described in the description of the 3D device.

To this end, a relationship of absorption axes of polarizers of the GR and GL regions and an optical axis of the retardation layer of the polarizing glasses to an optical axis of the retardation layer of the filter part may be designed as presented in the description of the 3D device.

In addition, when necessary, the retardation layer of the polarizing glasses and the retardation layer of the filter part may have the N, F or R properties. In this case, detailed descriptions of the N, F and R properties or combination of the N, F and R properties in the retardation layer of the polarizing glasses and the retardation layer of the filter part may be the same as those described in descriptions of the 3D device.

BRIEF DESCRIPTION OF THE DRAWINGS

FIGS. 2 and 3 show illustrative embodiments of arrangements of the LS and RS regions;

FIGS. 4 and 5 show illustrative embodiments of arrangements of the LC and RC regions;

DETAILED DESCRIPTION OF EXEMPLARY EMBODIMENTS

Figure 1:
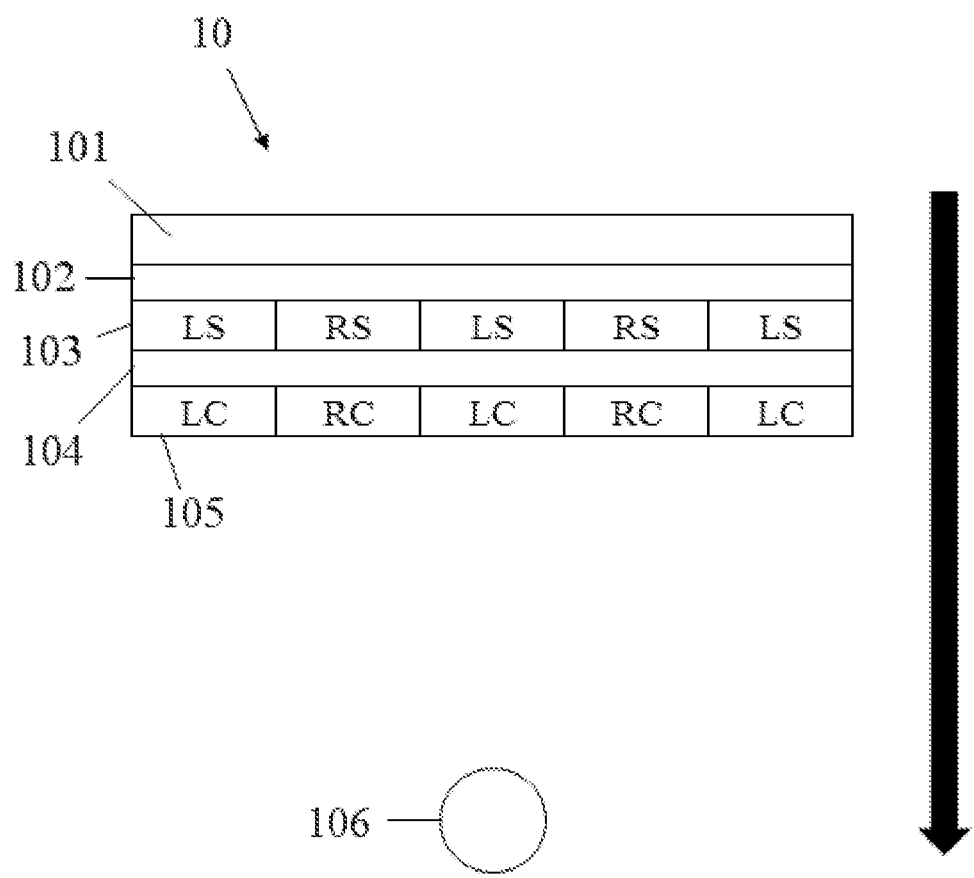
FIG. 1 shows one illustrative embodiment of the 3D device.

Hereinafter, the 3D device and the polarizing glasses will be described in detail with reference to Examples and Comparative Examples, but the scope of the device and glasses are not limited to the following Examples.

Hereinafter, in Examples, physical properties will be evaluated in the following manner:

1. Retardation Value of Retardation Layer

Retardation values of retardation layers were measured using an apparatus capable of measuring 16 Muller matrixes, i.e., Axoscan (Axomatrics). Specifically, by using the above apparatus, 16 Muller matrixes of the retardation layer were obtained, and thereby a retardation value was extracted.

2. Method of Evaluating Crosstalk Ratio

A crosstalk ratio of 3D devices may be measured by the following method. Firstly, polarizing glasses are placed at a conventional observation point of the 3D device. In the above, the conventional observation point is a point that is located a distance, which correspond to 3/2 times a length of the 3D device in a horizontal direction, away from a center of the 3D device. Assuming that the observer observes at the center of the 3D device, the glasses are placed. Assuming that the observer observes the three dimensional image, the length of the 3D device in a horizontal direction may be the length in the horizontal direction, relative to the observer, for example, a horizontal length of the 3D device. Under a state where the 3D device is emitting the L signal, brightness meters (apparatus name: SR-UL2 Spectrometer) are placed behind the GL and GR regions of the polarizing glasses, and the brightness in the GL and GR regions are measured. The brightness measured behind the GL region is the brightness in the bright state, and the brightness measured behind the GR region is the brightness in the dark state. After the brightness in each region is measured, a ratio of the brightness in the dark state to the brightness in the bright state ([(brightness in the dark state)/[brightness in the bright state]) may be calculated, and a percentage thereof may be defined as the crosstalk ratio. Alternatively, the crosstalk ratio may be measured in the same manner, except that brightness in the bright and dark states may be measured as the 3D device emits the R signal. In this case, a brightness measured behind the GL region is the brightness in the dark state, and a brightness measured behind the GR region is the brightness in the bright state. As described above, a percentage of a ratio between the brightness ([brightness in the dark state/brightness in the bright state]) may be defined as a crosstalk ratio.

3. Measurement of X and Y Values of CIE Color Space

The X and Y values of CIE color space were measured by the following method. Polarizing glasses were placed at the conventional observation point of the 3D device. Here, the conventional observation point was the same as one described above in the measurement of the crosstalk ratio. As the 3D device emits the L signal, a brightness meter (apparatus name: SR-UL2 Spectrometer) was placed behind the GL or GR regions of the polarizing glasses, a spectrum according to a wavelength in each case was measured, and then the X and Y values may be deduced from the spectrum. In the above, the X and Y values in the bright state may be measured from the spectrum measured behind the GL region, and the X and Y values in the dark state may be measured from the spectrum measured behind the GR region. The X and Y values may also be obtained by measuring a spectrum as the 3D device emits the R signal. When the R signal is emitted, the X and Y values in the dark state may be measured from the spectrum measured behind the GL region, and the X and Y values in the bright state may be measured from the spectrum measured behind the GR region.

Examples 1 to 9

Figure 2:
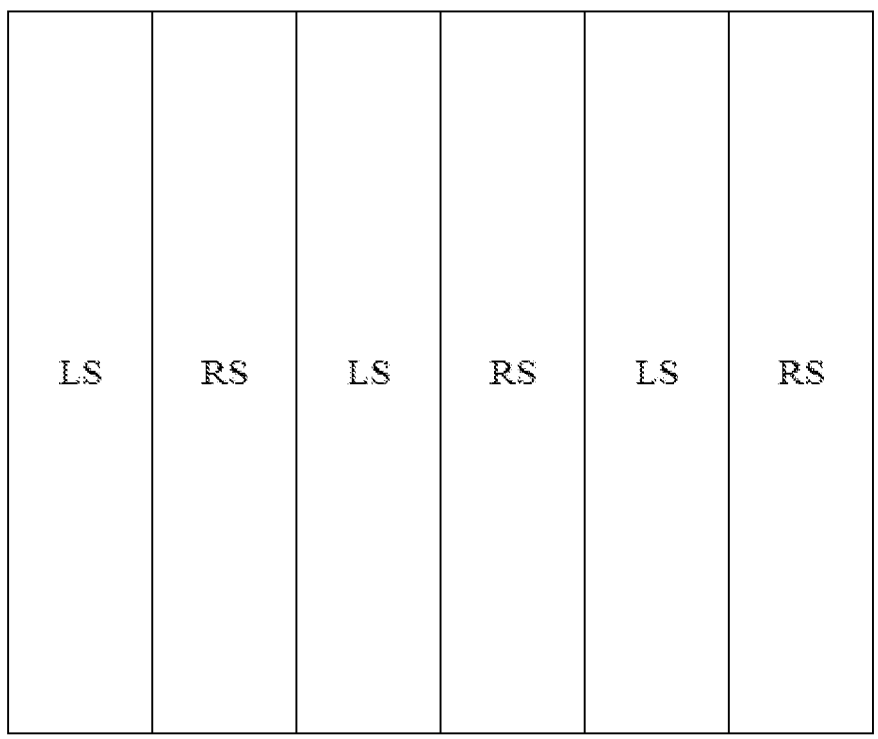
Figure 4:
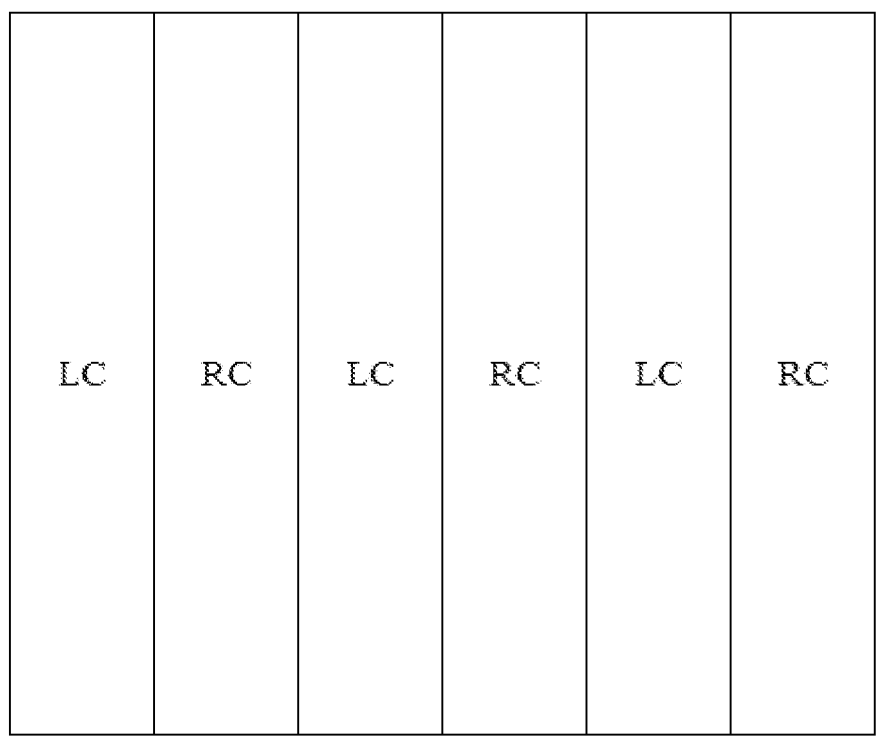
Figure 6:
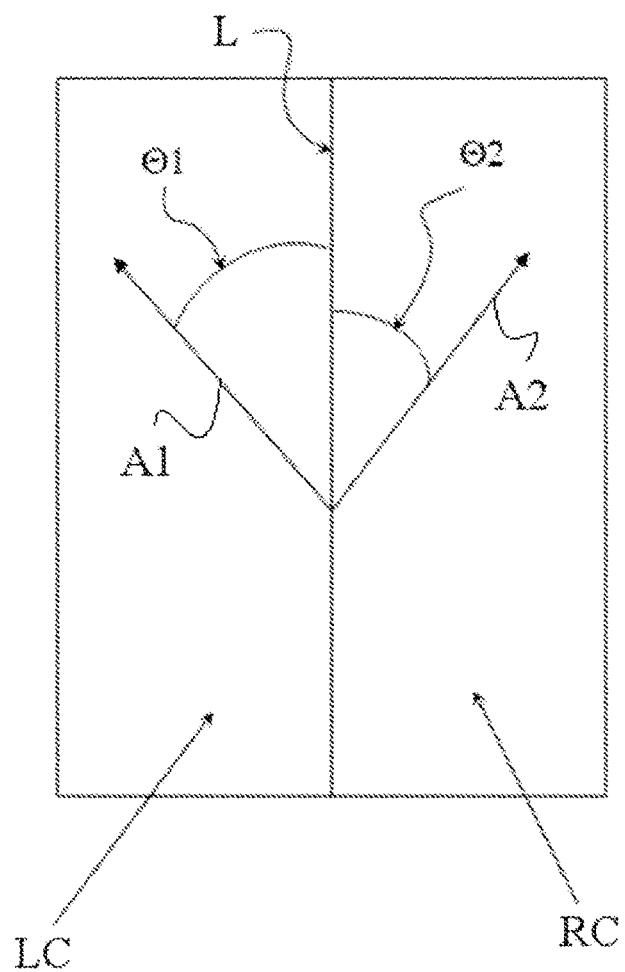
FIG. 6 shows one illustrative relationship between optical axes of retardation layers in the LC and RC regions.
Figure 7:
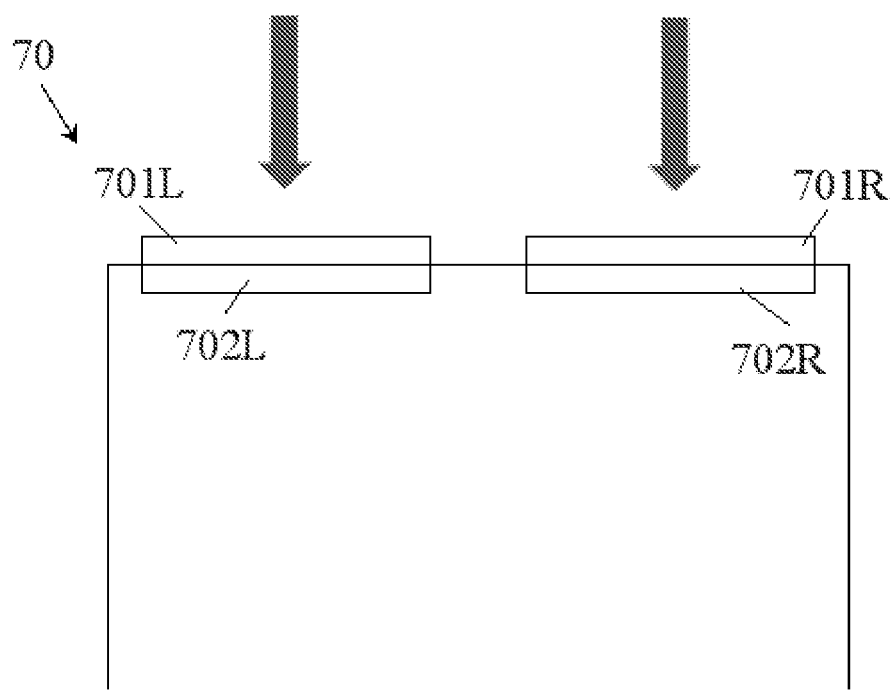
FIGS. 7 and 8 shows illustrative embodiments of the glasses for observing the three dimensional image.
Figure 8:
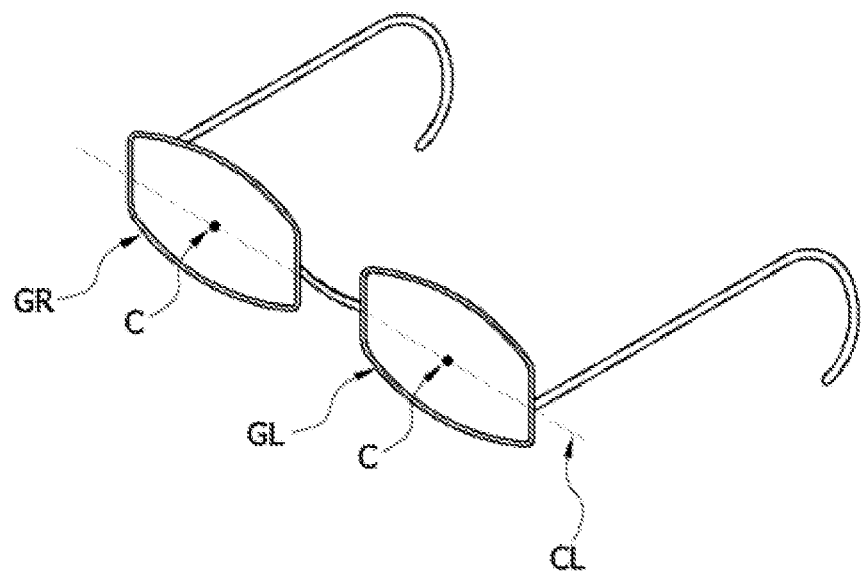
Figure 9:
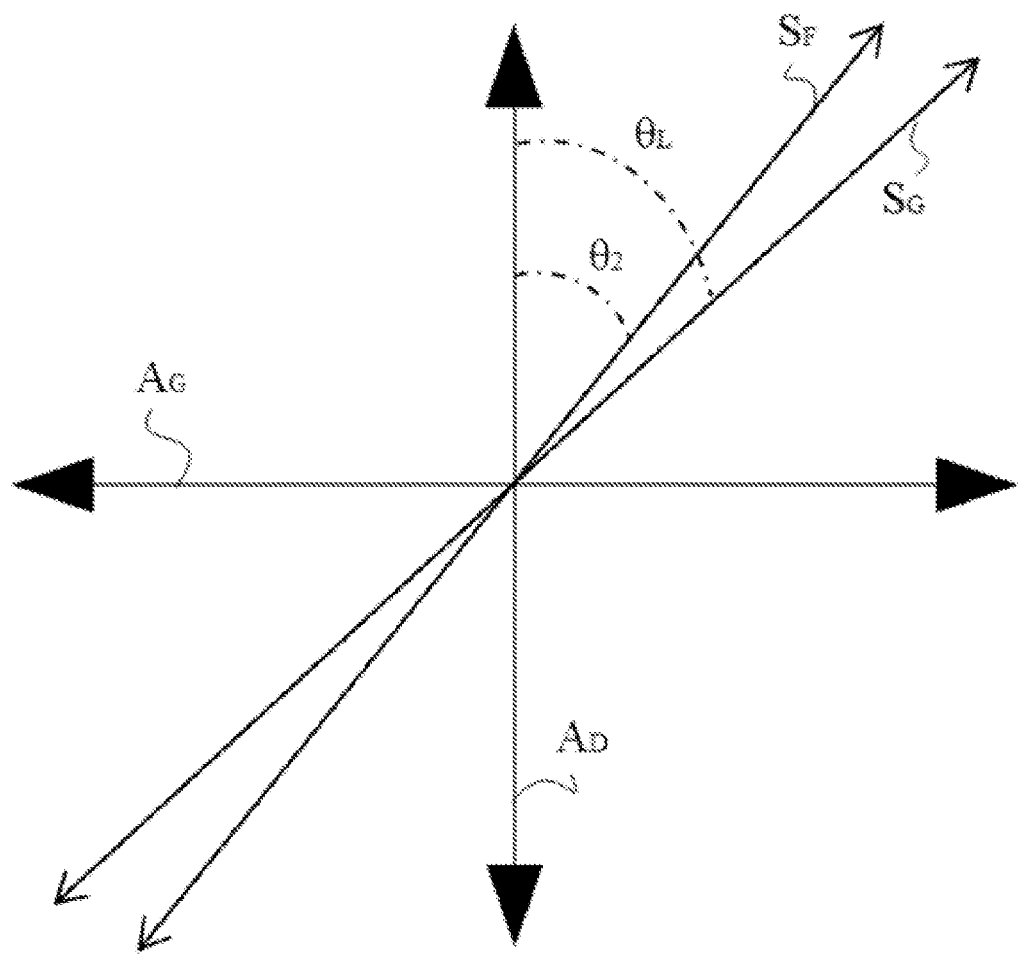
FIGS. 9 and 10 show illustrative embodiments illustrating the $D_R$ and the $D_L$.
Figure 10:
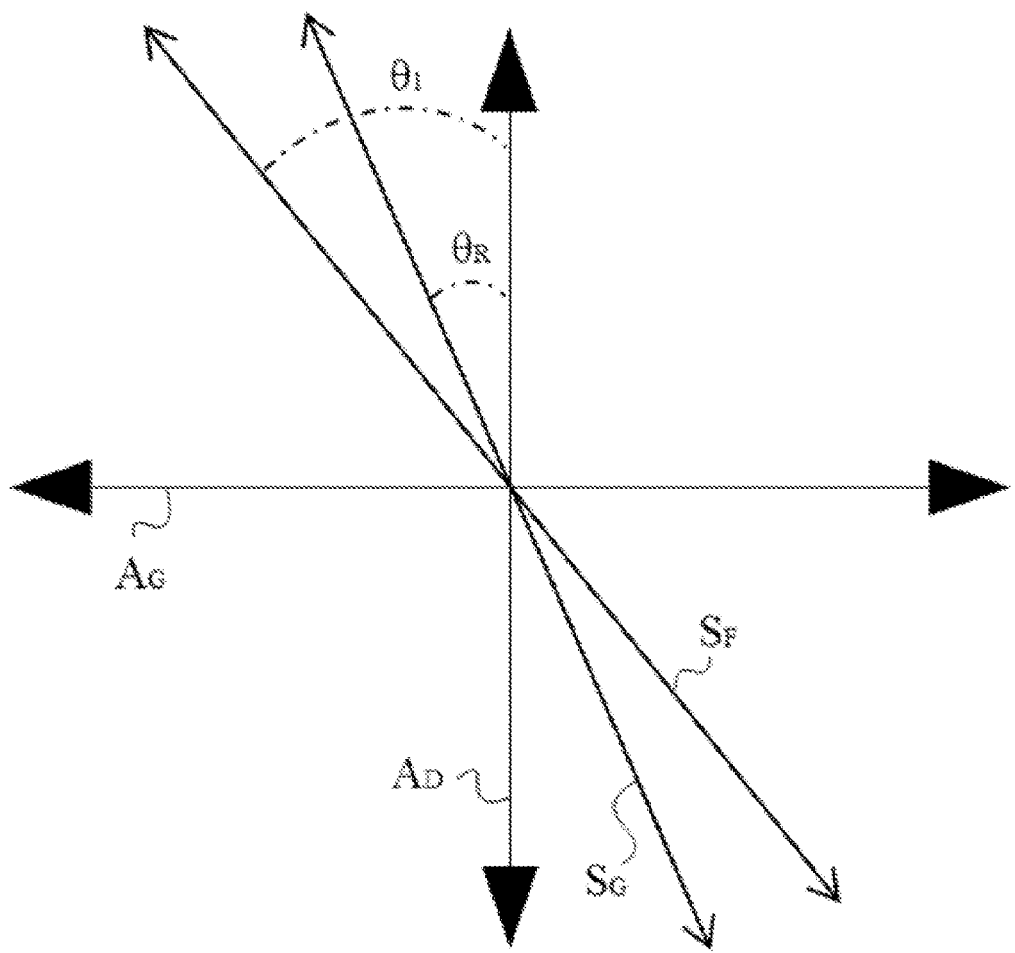
Figure 11:
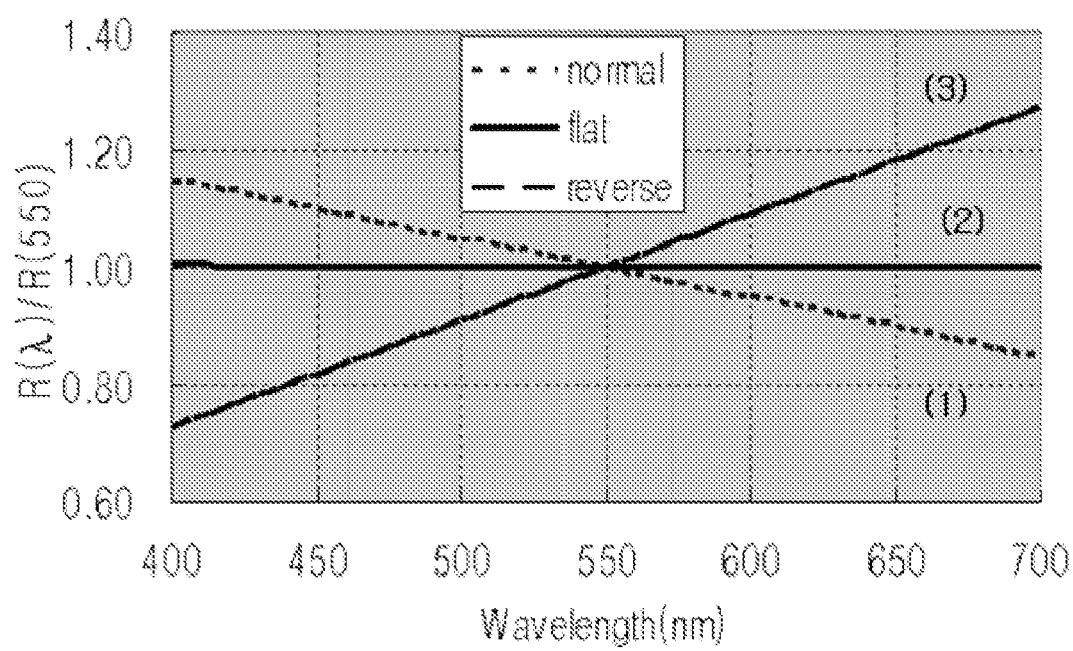
FIG. 11 shows a diagram illustrating a characteristic of a retardation layer having the N, F or R property used in Examples.

The 3D device was configured to have the structure as shown in FIG. 1. In the device, the RS and LS regions of the display part 103 were disposed as shown in FIG. 2, and the RC and LC regions of the filter part 105 were disposed as shown in FIG. 4. In the device 10, the RC region of the filter part had the retardation layer in which the slow axis was formed counter-clockwise at an angle of 45 degrees with respect to the absorption axis of the first polarizing plate 104, the LC region of the filter part had the retardation layer in which the slow axis formed clockwise at an angle of 45 degrees with respect to the absorption axis of the first polarizing plate 104. In the device 10, the absorption axis of the first polarizing plate 104 was formed to be parallel to a vertical direction of the device 10, and the absorption axis of the second polarizing plate 102 was perpendicular to the absorption axis of the first polarizing plate 104. Images emitted from the 3D device were observed using polarizing glasses including the GL and GR regions as shown in FIG. 7, thereby evaluating the crosstalk ratio. The polarizers 702L and 702R had absorption axes, respectively, which were parallel to each other, and when the polarizing glasses were placed so as for the imaginary line connecting centers of the GL and GR regions (the imaginary line CL in FIG. 8) to be perpendicular to the boundary between the LC and RC regions of the 3D device, the absorption axis of the first polarizing plate 104 was perpendicular to the absorption axes of the polarizers of the GL and GR regions. In addition, as the retardation layer 701L of the GL region, the retardation layer having the optical axis in substantially the same direction as the retardation layer of the LC region when the polarizing glasses were disposed so as for the absorption axis of the polarizer of the polarizing glasses to be perpendicular to the absorption axis of the first polarizing plate 104 was used. As the retardation layer 701R of the GR region, the retardation layer having an optical axis in substantially the same direction as the retardation layer of the RC region when the polarizing glasses were disposed so as for the absorption axis of the polarizer of the polarizing glasses to be perpendicular to the absorption axis of the first polarizing plate 104 was used. In the 3D device, kinds of the retardation layers of the LC and RC regions and the retardation layers of the GL and GR regions were changed as shown in Table 1, and the crosstalk ratios and the X and Y values in CIE color space were measured. The results are listed in Table 2.

TABLE 1

| | Retardation Layer of LC and RC Regions | Retardation Layer of GL and GR Regions |
|---|---|---|
| Example 1 | λ/4 wavelength layer having the N property | λ/4 wavelength layer having the N property |
| Example 2 | λ/4 wavelength layer having the N property | λ/4 wavelength layer having the N property |
| Example 3 | λ/4 wavelength layer having the N property | λ/4 wavelength layer having the R property |
| Example 4 | λ/4 wavelength layer having the F property | λ/4 wavelength layer having the F property |
| Example 5 | λ/4 wavelength layer having the F property | λ/4 wavelength layer having the N property |
| Example 6 | λ/4 wavelength layer having the F property | λ/4 wavelength layer having the R property |
| Example 7 | λ/4 wavelength layer having the R property | λ/4 wavelength layer having the R property |
| Example 8 | λ/4 wavelength layer having the R property | λ/4 wavelength layer having the N property |
| Example 9 | λ/4 wavelength layer having the R property | λ/4 wavelength layer having the F property |

λ/4 wavelength layer having the N property: λ/4 wavelength layer having R(450)/R(550) of approximately 1.1, and R(650)/R(550) of approximately 0.9
λ/4 wavelength layer having the F property: λ/4 wavelength layer having R(450)/R(550) of approximately 1.1, R(650)/R(550) of approximately 1.1
λ/4 wavelength layer having the R property: λ/4 wavelength layer having R(450)/R(550) of approximately 0.9, R(650)/R(550) of approximately 1.1

TABLE 2

| | Crosstalk Ratio (%) | CIE Color Space in Bright State | | CIE Color Space in Dark State | |
|---|---|---|---|---|---|
| | | X value | Y value | X value | Y value |
| Example 1 | 0.5 | 0.328 | 0.3483 | 0.3333 | 0.3333 |
| Example 2 | 1.25 | 0.3244 | 0.3382 | 0.4344 | 0.2367 |
| Example 3 | 3.31 | 0.325 | 0.3336 | 0.3136 | 0.1315 |
| Example 4 | 0.5 | 0.3272 | 0.3362 | 0.3333 | 0.3333 |
| Example 5 | 1.25 | 0.3244 | 0.3382 | 0.4344 | 0.2367 |
| Example 6 | 1.21 | 0.3278 | 0.3328 | 0.2253 | 0.0795 |
| Example 7 | 0.5 | 0.3293 | 0.3314 | 0.3333 | 0.3333 |
| Example 8 | 3.31 | 0.325 | 0.3336 | 0.3136 | 0.1315 |
| Example 9 | 1.21 | 0.3278 | 0.3328 | 0.2253 | 0.0795 |

As seen from the results of Table 2, it can be confirmed that crosstalk ratios in observation of a three dimensional image and color characteristics in bright and dark states may be controlled by controlling wavelength dispersion properties of the retardation layer of the filter part and the retardation layer of the polarizing glasses.

It is seen from the results of Table 2 that when the wavelength dispersion properties of the retardation layer of the filter part and the retardation layer of the polarizing glasses are the same as each other, it is advantageous for improving the color characteristic in a dark state, and when the wavelength dispersion properties of the retardation layer of the filter part and the retardation layer of the polarizing glasses are different from each other, it is advantageous for improving the color characteristic in a bright state. Particularly, it was confirmed that when both the retardation layer of the filter part and the retardation layer of the polarizing glasses were retardation layers having the R property, excellent results were obtained in all aspects of the crosstalk ratio, and the color characteristics in bright and dark states.

According to a 3D device and polarizing glasses of the present invention, a three dimensional image having excellent crosstalk ratio and color characteristic can be observed.

What is claimed is:

1. A stereoscopic image display device, an image emitted from which is observed with wearing polarizing glasses comprising a region for a right eye and a region for a left eye, each region comprising a retardation layer and a polarizer, the device comprising:
    a display part configured to generate an image signal; and
    a filter part comprising a first region and a second region, which are configured to divide the image signal from the display part into at least two signals having different polarizing states from each other, each region comprising a retardation layer,
    wherein a crosstalk ratio measured during observing the image signal with wearing the polarizing glasses is 6% or less, an X value and a Y value of a tristimulus value of CIE color space of the image signal in a bright state are in the range from 0.322 to 0.344 and from 0.316 to 0.350, respectively, and an X value and a Y value of a tristimulus value of CIE color space of the image signal in a dark state are in the range from 0.223 to 0.443 and from 0.078 to 0.589, respectively,
    wherein the retardation layers of the regions for right and left eyes of the polarizing glasses and the retardation layers in the first and second regions of the filter part satisfy the General Formula 1 or 2:

$$D_L = |\theta_2 - \theta_L| \leq 15 \text{ degrees} \quad \text{[General Formula 1]}$$

$$D_R = |\theta_1 - \theta_R| \leq 15 \text{ degrees} \quad \text{[General Formula 2]}$$

wherein $D_L$ is a relative deviated degree of the optical axis of the retardation layer in the second region and the optical axis of the retardation layer in the region for the left eye, $\theta_2$ is an angle formed by the optical axis of the retardation layer in the second region and the absorption axis of the first polarizing plate, $\theta_L$ is an angle formed by the optical axis of the retardation layer in the region for the left eye and the absorption axis of the first polarizing plate under a state where the polarizing glasses are placed so as for the absorption axis of the polarizer in the region for the left eye to be perpendicular to the absorption axis of the first polarizing plate, DR is a relative deviated degree of the optical axis of the retardation layer in the first region and the optical axis of the retardation layer in the region for the right eye, $\theta_1$ is an angle formed by the optical axis of the retardation layer in the first region and the absorption axis of the first polarizing plate, and θR is an angle formed by the optical axis of the retardation layer in the region for the right eye and the absorption axis of the first polarizing plate under a state where the polarizing glasses are placed so as for the absorption axis of the polarizer in the region for the right eye to be perpendicular to the absorption axis of the first polarizing plate.

2. The stereoscopic image display device of claim 1, wherein the retardation layer of the filter part is a λ/4 wavelength layer.

3. The stereoscopic image display device of claim 2, wherein an optical axis of the retardation layer of the first region and an optical axis of the retardation layer of the second region are formed in different directions from each other.

4. The stereoscopic image display device of claim 1, wherein the retardation of the filter part and the retardation layer of the polarizing glasses have a normal wavelength dispersion property, a flat wavelength dispersion property, or a reverse wavelength dispersion property.

5. The stereoscopic image display device of claim 4, wherein R(450)/R(550) of the retardation layer having the normal wavelength dispersion property is in the range from 1.01 to 1.19, and R(650)/R(550) of the retardation layer having the normal wavelength dispersion property is in the range from 0.81 to 0.99, the "R(450)," "R(550)" and "R(650)" being retardation values of the retardation layers with respect to light having wavelengths of 450 nm, 550 nm and 650 nm, respectively.

6. The stereoscopic image display device of claim 5, wherein {R(650)−R(450)}/{200×R(550)} of the retardation layer having the normal wavelength dispersion property is in the range from −0.0019 to −0.0001.

7. The stereoscopic image display device of claim 4, wherein R(450)/R(550) of the retardation layer having the flat wavelength dispersion property is in the range from 1.01 to 1.19, and R(650)/R(550) of the retardation layer having the flat wavelength dispersion property is in the range from 1.01 to 1.19, the "R(450)," "R(550)" and "R(650)" being retardation values of the retardation layers with respect to light having wavelengths of 450 nm, 550 nm and 650 nm, respectively.

8. The stereoscopic image display device of claim 7, wherein {R(650)−R(450)}/{200×R(550)} of the retardation layer having the flat wavelength dispersion property is in the range from −0.0009 to 0.0009.

9. The stereoscopic image display device of claim 4, wherein R(450)/R(550) of the retardation layer having the reverse wavelength dispersion property is in the range from 0.81 to 0.99, and R(650)/R(550) of the retardation layer having the reverse wavelength dispersion property is in the range from 1.01 to 1.19, the "R(450)," "R(550)" and "R(650)" being retardation values of the retardation layers with respect to light having wavelengths of 450, 550 and 650 nm, respectively.

10. The stereoscopic image display device of claim 9, wherein {R(650)−R(450)}/{200×R(550)} of the retardation layer having the reverse wavelength dispersion property is in the range from 0.0001 to 0.0019.

11. The stereoscopic image display device of claim 1, wherein the retardation layer of the filter part and the retardation layer of the polarizing glasses have the same wavelength dispersion property, and also satisfy Equation 4:

$$-20\ \text{nm} \leq R_2(\lambda) - R_1(\lambda) \leq 20\ \text{nm} \quad [\text{Equation 4}]$$

wherein $R_1(\lambda)$ is a retardation value of the retardation layer of the filter part measured with respect to light having a wavelength of λ nm, and $R_2(\lambda)$ is a retardation value of the retardation layer of the polarizing glasses measured with respect to light having a wavelength of λ nm.

12. The stereoscopic image display device of claim 11, wherein the retardation layer of the filter part has a reverse wavelength dispersion property.

13. The stereoscopic image display device of claim 1, wherein retardation layer of the filter part and the retardation layer of the polarizing glasses have different wavelength dispersion properties from each other, and also satisfy Equation 5:

$$-40\ \text{nm} \leq R_2(\lambda) - R_1(\lambda) \leq 40\ \text{nm} \quad [\text{Equation 5}]$$

wherein $R_1(\lambda)$ is a retardation value of the retardation layer of the filter part measured with respect to light having a wavelength of λ nm, and $R_2(\lambda)$ is a retardation value of the retardation layer of the polarizing glasses measured with respect to light having a wavelength of λ nm.

14. The stereoscopic image display device of claim 13, wherein the retardation layer of the filter part has a flat wavelength dispersion property, and the retardation layer of the polarizing glasses has a reverse wavelength dispersion property or a normal wavelength dispersion property.

15. The stereoscopic image display device of claim 13, wherein the retardation layer of the filter part has a normal wavelength dispersion property, and the retardation layer of the polarizing glasses has a reverse wavelength dispersion property or a flat wavelength dispersion property.

16. The stereoscopic image display device of claim 13, wherein the retardation layer of the filter part has a reverse wavelength dispersion property, and the retardation layer of the polarizing glasses has a normal wavelength dispersion property or a flat wavelength dispersion property.

17. Polarizing glasses for observing an image emitted from a stereoscopic image display device comprising a display part configured to generate an image signal; a filter part comprising a first region and a second region, which are configured to divide the image signal generated from the display part into at least two signals having different polarizing states from, each region having a retardation layer; and a first polarizing plate between the display part and the filter part, comprising: a region for a right eye and a region for a left eye, each region comprising a retardation layer and a polarizer, wherein a crosstalk ratio of the image observed with wearing the polarizing glasses is 6% or less, an X value and a Y value of a tristimulus value of CIE color space of the image signal in a bright state are in the range from 0.322 to 0.344 and from 0.316 to 0.350, respectively, and an X value and a Y value of a tristimulus value of CIE color space of the image signal in a dark state are in the range from 0.223 to 0.443 and from 0.078 to 0.589, respectively, wherein the retardation layers of the regions for right and left eyes of the polarizing glasses and the retardation layers in the first and second regions of the filter part satisfy the General Formula 1 or 2:

$$D_L = |\theta_2 - \theta_L| \leq 15\ \text{degrees} \quad [\text{General Formula 1}]$$

$$D_R |\theta_1 - \theta_R| \leq 15\ \text{degrees} \quad [\text{General Formula 2}]$$

wherein $D_L$ is a relative deviated degree of the optical axis of the retardation layer in the second region and the optical axis of the retardation layer in the region for the left eye, $\theta_2$ is an angle formed by the optical axis of the retardation layer in the second region and the absorption axis of the first polarizing plate, $\theta_L$ is an angle formed by the optical axis of the retardation layer in the region for the left eye and the absorption axis of the first polarizing plate under a state where the polarizing glasses are placed so as for the absorption axis of the polarizer in the region for the left eye to be perpendicular to the absorption axis of the first polarizing plate, $D_R$ is a relative deviated degree of the optical axis of the retardation layer in the first region and the optical axis of the retardation layer in the region for the right eye, $\theta_1$ is an angle formed by the optical axis of the retardation layer in the first region and the absorption axis of the first polarizing plate, and $\theta_R$ is an angle formed by the optical axis of the retardation layer in the region for the right eye and the absorption axis of the first polarizing plate under a state where the polarizing glasses are placed so as for the absorption axis of the polarizer in the region for the right eye to be perpendicular to the absorption axis of the first polarizing plate.

18. The polarizing glasses of claim 17, wherein an absorption axis of the polarizer of the region for the right eye and an absorption axis of the polarizer of the region for the left eye are formed to be parallel to each other, and the absorption axes of the polarizers formed to be parallel to each other are perpendicular to an absorption axis of the first polarizing plate under the state where the polarizing glasses are positioned so as for an imaginary line connecting centers of the region for the right eye and the region for the left eye to be perpendicular or parallel to a boundary line between the first and second regions of the stereoscopic image display device.

19. The polarizing glasses of claim 1, wherein the retardation layer of the filter part and the retardation layer of the polarizing glasses have a normal wavelength dispersion property, a flat wavelength dispersion property, or a reverse wavelength dispersion property.

\* \* \* \* \*